United States Patent
Fu et al.

(10) Patent No.: US 10,466,768 B2
(45) Date of Patent: Nov. 5, 2019

(54) POWER SOURCING EQUIPMENT CHIP, AND POWER OVER ETHERNET DEVICE AND METHOD

(71) Applicant: Huawei Technologies Co., Ltd., Shenzhen (CN)

(72) Inventors: Shiyong Fu, Nanjing (CN); Yan Zhuang, Nanjing (CN); Rui Hua, Suzhou (CN); Jianguang Yang, Nanjing (CN); Xueqi Chen, Nanjing (CN); Haifei Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/581,977

(22) Filed: Apr. 28, 2017

(65) Prior Publication Data
US 2017/0235358 A1    Aug. 17, 2017

Related U.S. Application Data

(63) Continuation of application No. PCT/CN2015/092696, filed on Oct. 23, 2015.

(30) Foreign Application Priority Data

Oct. 30, 2014 (CN) .......................... 2014 1 0604210

(51) Int. Cl.
*G06F 1/32* (2019.01)
*G06F 1/3287* (2019.01)
*H04L 12/10* (2006.01)
*G06F 1/26* (2006.01)
*H04L 12/40* (2006.01)
(Continued)

(52) U.S. Cl.
CPC ............ *G06F 1/3287* (2013.01); *G06F 1/266* (2013.01); *G06F 1/3209* (2013.01);
(Continued)

(58) Field of Classification Search
CPC ...... G06F 1/266; G06F 1/3209; G06F 1/3287; G06F 1/3296; H04L 12/10; H04L 12/40045; H04L 12/40182; Y02D 50/30
See application file for complete search history.

(56) References Cited

U.S. PATENT DOCUMENTS

| | | | |
|---|---|---|---|
| 8,305,906 B2 * | 11/2012 | Karam | .................... H04L 12/10 370/241 |
| 2010/0217447 A1 * | 8/2010 | Karam | .................... H04L 12/10 700/286 |

(Continued)

FOREIGN PATENT DOCUMENTS

| | | |
|---|---|---|
| CN | 101282275 A | 10/2008 |
| CN | 101860443 A | 10/2010 |

(Continued)

OTHER PUBLICATIONS

IEEE, "Part 3: Carrier Sense Multiple Access with Collision Detection (CSMA/CD) Access Method and Physical Layer Specifications—Amendment 3: Data Terminal Equipment (DTE) Power Via the Media Dependent Interface(MDI) Enhancements," IEEE Std 802.3at™—2009 (aMENDMENT to IEEE Std 802.3™—2008), 141 pages.

*Primary Examiner* — Fahmida Rahman
(74) *Attorney, Agent, or Firm* — Slater Matsil, LLP (57) ABSTRACT

A power sourcing equipment (PSE) chip, and a Power over Ethernet (PoE) device and method are provided, which can determine a status that a peer end is connected to a powered device (PD) when four cable pairs are used to supply power. The PSE chip includes a channel controller, a first channel detector, and a second channel detector. The channel controller sends detection voltages along a first and a second groups of cable pairs in an Ethernet twisted pair; determines a first impedance and a second impedance according to the detection voltages and corresponding currents that are
(Continued)

detected; and determines that a first group or a second group of cable pairs is connected to a valid PD according to the impedances and a preset range.

6 Claims, 2 Drawing Sheets

(51) Int. Cl.
    *G06F 1/3209*     (2019.01)
    *G06F 1/3296*     (2019.01)

(52) U.S. Cl.
    CPC ............ *G06F 1/3296* (2013.01); *H04L 12/10* (2013.01); *H04L 12/40045* (2013.01); *H04L 12/40182* (2013.01); *Y02D 50/30* (2018.01)

(56) References Cited

U.S. PATENT DOCUMENTS

| | | | |
|---|---|---|---|
| 2011/0085584 A1 | 4/2011 | Wei et al. | |
| 2011/0202784 A1 | 8/2011 | Mizutani | |
| 2013/0113275 A1 | 5/2013 | Dwelley et al. | |
| 2013/0191654 A1 | 7/2013 | Schlichter | |
| 2013/0257161 A1 | 10/2013 | Ferentz et al. | |
| 2014/0129850 A1 | 5/2014 | Paul | |
| 2015/0326403 A1* | 11/2015 | Dwelley | ................. H04L 12/10 |
| | | | 713/300 |
| 2016/0197735 A1* | 7/2016 | Ferentz | ................... H04L 43/08 |
| | | | 307/1 |

FOREIGN PATENT DOCUMENTS

| | | |
|---|---|---|
| CN | 103812667 A | 5/2014 |
| CN | 104106236 A | 10/2014 |
| EP | 2587718 A1 | 5/2013 |
| JP | 2011188483 A | 9/2011 |
| JP | 2013118622 A | 6/2013 |
| WO | 2005036815 A1 | 4/2005 |
| WO | 2006030412 A1 | 3/2006 |
| WO | 2006081225 A2 | 8/2006 |

\* cited by examiner

POWER SOURCING EQUIPMENT CHIP, AND POWER OVER ETHERNET DEVICE AND METHOD

CROSS-REFERENCE TO RELATED APPLICATIONS

This application is a continuation of International Application No. PCT/CN2015/092696, filed on Oct. 23, 2015, which claims priority to Chinese Patent Application No. 201410604210.1, filed on Oct. 30, 2014. The disclosures of the aforementioned applications are hereby incorporated by reference in their entireties.

TECHNICAL FIELD

This application relates to the field of Power over Ethernet technologies, and in particular, to a power sourcing equipment chip, and a Power over Ethernet device and method.

BACKGROUND

Power over Ethernet (PoE) is a technology using a twisted pair to both transmit Ethernet data and supply electric power. The electric power refers to supplied electricity.

According to specifications of the Telecommunications Industry Association (TIA)/Electronic Industries Alliance (EIA) 568 (TIA/EIA-568), in an Ethernet twisted pair, a cable connected to a pin 1 (a cable 1 below) in an 8 position 8 contact (8P8C) modular connector and a cable connected to a pin 2 (a cable 2 for short below) in the 8P8C modular connector form a cable pair 3; a cable connected to a pin 3 (a cable 3 for short below) in the 8P8C modular connector and a cable connected to a pin 6 (a cable 6 for short below) in the 8P8C modular connector form a cable pair 2; a cable connected to a pin 4 (a cable 4 for short below) in the 8P8C modular connector and a cable connected to a pin 5 (a cable 5 for short below) in the 8P8C modular connector form a cable pair 1; a cable connected to a pin 7 (a cable 7 for short below) in the 8P8C modular connector and a cable connected to a pin 8 (a cable 8 for short below) in the 8P8C modular connector form a cable pair 4.

A PoE device includes two types of devices: power sourcing equipment (PSE) and a powered device (PD), or a PoE device may be both PSE and a PD. The PSE is a device that supplies electric power to the PD. The PD is a device that receives electric power, for example, an Ethernet device such as an Internet Protocol (IP) phone, a network camera, a wireless access point (WAP), a personal digital assistant (PDA), or a mobile phone charger.

Conventional PSE supports only two cable pairs in power supplying. For example, the PSE uses only the cable 1, the cable 2, the cable 3, and the cable 6 in the Ethernet twisted pair to supply power, or uses the cable 4, the cable 5, the cable 7, and the cable 8 in the Ethernet twisted pair to supply power. For example, if the PSE uses the cable 1, the cable 2, the cable 3, and the cable 6 in the Ethernet twisted pair to supply power, the PSE sends a detection signal to a peer end. When the PSE detects that a resistance and a capacitance of the peer end fall within a set range, for example, when the resistance falls within a range from 19 kilohms to 26.5 kilohms (kΩ) and the capacitance is less than 0.150 microfarad (μF), the PSE determines that the peer end is connected to a valid PD. The peer end is an end of the Ethernet twisted pair other than the other end connected to the PSE.

Classes negotiated between the PSE and the PD are classes 0 to 4. Power provided by the PSE is maximum in case of the class 4, and output power is approximately 30 watts (W). When power required by the PD is greater than 30 W, the PSE that supports only two cable pairs in supplying power cannot meet a requirement of the PD, and the PSE needs to use four cable pairs to supply power, that is, use both a first group of cable pairs and a second group of cable pairs to supply power to the PD. The first group of cable pairs include the cable pair 2 and the cable pair 3, and the second group of cable pairs include the cable pair 1 and the cable pair 4.

However, currently, if the PSE needs to use four cable pairs to supply power, there is no way to determine a status that a peer end is connected to a PD. As a result, power cannot be supplied, according to the status that the peer end is connected to the PD, to the PD connected to the peer end.

SUMMARY

This application provides a power sourcing equipment chip, and a Power over Ethernet device and method, which can determine a status that a peer end is connected to a PD when four cable pairs are used to supply power, so as to supply power to the PD connected to the peer end.

According to a first aspect, a power sourcing equipment chip is provided, including a channel controller, a first channel detector, and a second channel detector. The channel controller sends, along a first group of cable pairs in an Ethernet twisted pair, a first detection voltage by using the first channel detector, and sends, along a second group of cable pairs in the Ethernet twisted pair, a second detection voltage by using the second channel detector. The channel controller determines a first impedance according to the first detection voltage and a current that is detected by the first channel detector, and determines a second impedance according to the second detection voltage and a current that is detected by the second channel detector. The channel controller supplies power along only the first group of cable pairs when the first impedance falls within a preset range and the second impedance falls beyond the preset range; or the channel controller supplies power along only the second group of cable pairs when the second impedance falls within the preset range and the first impedance falls beyond the preset range. The first channel detector detects the current in the first group of cable pairs when the channel controller sends, along the first group of cable pairs, the first detection voltage by using the first channel detector. The second channel detector detects the current in the second group of cable pairs when the channel controller sends, along the second group of cable pairs, the second detection voltage by using the second channel detector.

With reference to the first aspect, in a first possible implementation manner, the power sourcing equipment chip further includes a third channel detector, where the third channel detector is connected to both the first group of cable pairs and the second group of cable pairs; the channel controller sends, along the first group of cable pairs and the second group of cable pairs, a third detection voltage by using the third channel detector when both the first impedance and the second impedance fall within the preset range, and determines a total resistance according to the third detection voltage and the sum of currents that is detected by the third channel detector; the channel controller supplies power by using a trunk when both the first impedance and the second impedance fall within the preset range and the total resistance falls within a resistance value range, and supplies power along the first group of cable pairs and the second group of cable pairs when the channel controller supplies power by using the trunk; and the third channel detector detects the sum of the current in the first group of cable pairs and the current in the second group of cable pairs when the channel controller sends, along the first group of cable pairs and the second group of cable pairs, the third detection voltage by using the third channel detector.

With reference to the first possible implementation manner of the first aspect, in a second possible implementation manner, the channel controller supplies power by using a first branch and supplies power by using a second branch when both the first impedance and the second impedance fall within the preset range and the total resistance falls beyond the resistance value range, where power supply performed by using the first branch is independent of power supply performed by using the second branch; and supply power along only the first group of cable pairs when power is supplied by using the first branch, and supply power along only the second group of cable pairs when power is supplied by using the second branch.

According to a second aspect, a Power over Ethernet device is provided, including an Ethernet interface and the power sourcing equipment chip provided in the first aspect, where the power sourcing equipment is connected to the Ethernet interface.

With reference to the second aspect, in a first possible implementation manner, the power sourcing equipment chip includes multiple groups of channel detectors, where each group of channel detectors in the multiple groups of channel detectors includes a corresponding first channel detector and a corresponding second channel detector; the channel controller is connected to each group of channel detectors in the multiple groups of channel detectors; the first channel detector in each group of channel detectors in the multiple groups of channel detectors is connected to a contact, connected to the first group of cable pairs, in an Ethernet port, and the second channel detector in each group of channel detectors is connected to a contact, connected to the second group of cable pairs, in the Ethernet interface that is connected to the first channel detector in the group of channel detectors; and different groups of channel detectors are connected to different Ethernet interfaces.

With reference to the first possible implementation manner of the second aspect, in a second possible implementation manner, each group of channel detectors in the multiple groups of channel detectors further includes a corresponding third channel detector, where the third channel detector in each group of channel detectors in the multiple groups of channel detectors is connected to the contact, connected to the first group of cable pairs, in the Ethernet interface that is connected to the first channel detector in the group of channel detectors, and is connected to the contact, connected to the second group of cable pairs, in the Ethernet interface.

According to a third aspect, a Power over Ethernet method is provided. The method includes sending, by a PSE chip, a first detection voltage through an Ethernet interface along a first group of cable pairs in an Ethernet twisted pair; detecting a current in the first group of cable pairs when the first detection voltage is sent along the first group of cable pairs. The method also includes determining a first impedance according to the first detection voltage and the current in the first group of cable pairs that is detected when the first detection voltage is sent. The method also includes sending, by the PSE chip, a second detection voltage through the Ethernet interface along a second group of cable pairs in the Ethernet twisted pair. The method also includes detecting a current in the second group of cable pairs when the second detection voltage is sent along the second group of cable pairs, and determining a second impedance according to the second detection voltage and the current in the second group of cable pairs that is detected when the second detection voltage is sent. The method also includes supplying, by the PSE chip, power along only the first group of cable pairs when the first impedance falls within a preset range and the second impedance falls beyond the preset range; or supplying power along only the second group of cable pairs when the second impedance falls within the preset range and the first impedance falls beyond the preset range.

With reference to the third aspect, in a first possible implementation manner, when both the first impedance and the second impedance fall within the preset range, the method further includes: sending, by the PSE chip, a third detection voltage through the Ethernet interface along the first group of cable pairs and the second group of cable pairs; detecting the sum of the current in the first group of cable pairs and the current in the second group of cable pairs when the third detection voltage is sent along the first group of cable pairs and the second group of cable pairs; determining a total resistance according to the third detection voltage and the detected sum of the currents; and supplying power by using a trunk when the total resistance falls within a resistance value range; and supplying power along the first group of cable pairs and the second group of cable pairs when the PSE chip supplies power by using the trunk.

With reference to the first possible implementation manner of the third aspect, in a second possible implementation manner, the method includes: supplying, by the PSE chip, power by using a first branch and supplying power by using a second branch when both the first impedance and the second impedance fall within the preset range and the total resistance falls beyond the resistance value range, where power supply performed by using the first branch is independent of power supply performed by using the second branch; and supplying power along only the first group of cable pairs when the PSE chip supplies power by using the first branch, and supplying power along only the second group of cable pairs when the PSE chip supplies power by using the second branch.

According to the PSE chip, and the Power over Ethernet device and method provided in this application, a channel controller sends, along a first group of cable pairs, a first detection voltage to a peer end by using a first channel detector, and the first channel detector detects a current in the first group of cable pairs when the channel controller sends the first detection voltage; therefore, the channel controller can determine a first impedance according to the first detection voltage and the current that is detected by the first channel detector. In addition, the channel controller sends, along a second group of cable pairs, a second detection voltage to the peer end by using a second channel detector, and the second channel detector detects a current in the second group of cable pairs when the channel controller sends the second detection voltage; therefore, the channel controller can determine a second impedance according to the second detection voltage and the current that is detected by the second channel detector. In this way, a status that the peer end is connected to a PD can be determined according to the first impedance and the second impedance, so as to supply power to a valid PD connected to the peer end.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

According to a PSE chip, and a Power over Ethernet device and method provided in embodiments of the present invention, a channel controller can determine a first impedance according to a sent first detection voltage and a current that is detected by a first channel detector, and can determine a second impedance according to a sent second detection voltage and a current that is detected by a second channel detector. In this way, a status that a peer end is connected to a PD can be determined according to the first impedance and the second impedance.

The following describes the embodiments of the present invention with reference to the accompanying drawings in this specification.

Figure 1:
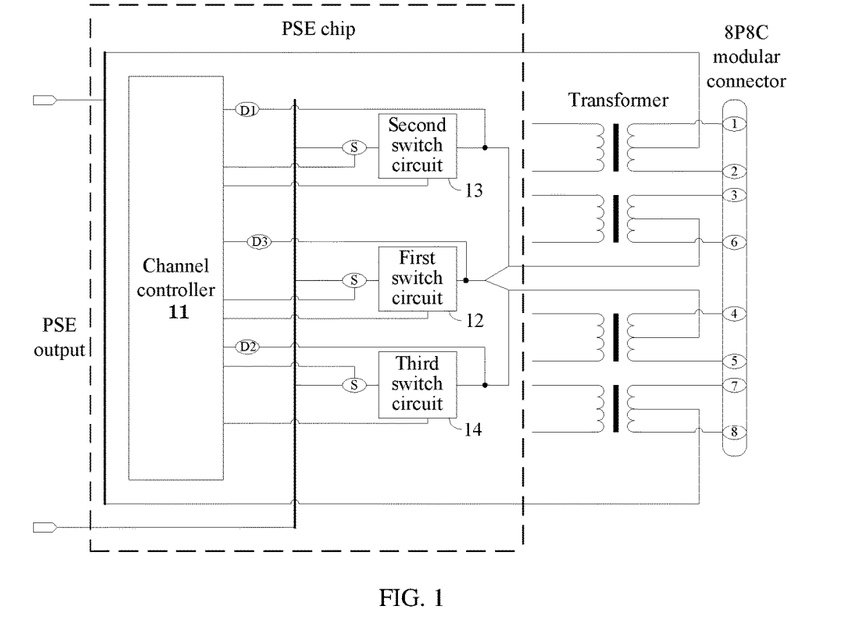
FIG. 1 is a first schematic structural diagram of a PSE chip according to an embodiment of the present invention.
Figure 2:
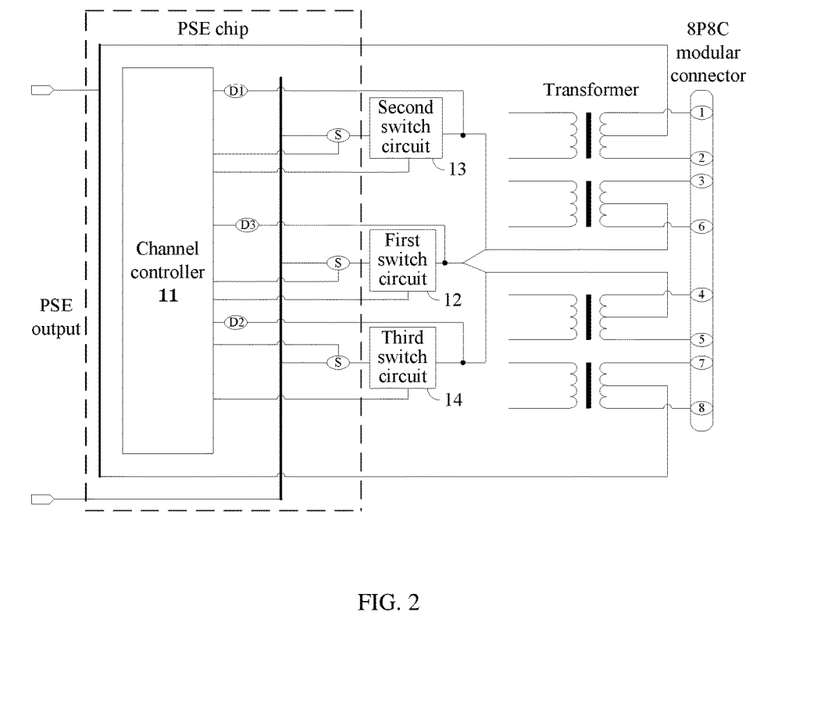
FIG. 2 is a second schematic structural diagram of a PSE chip according to an embodiment of the present invention.

As shown in FIG. 1 or FIG. 2, a power sourcing equipment chip provided in an embodiment of the present invention includes a channel controller 11, a first channel detector D1, and a second channel detector D2, where the channel controller 11 sends, along a first group of cable pairs in an Ethernet twisted pair, a first detection voltage to a peer end by using the first channel detector D1, and sends, along a second group of cable pairs in the Ethernet twisted pair, a second detection voltage to the peer end by using the second channel detector D2; determines a first impedance according to the first detection voltage and a current that is detected by the first channel detector D1, and determines a second impedance according to the second detection voltage and a current that is detected by the second channel detector D2; and determines that the first group of cable pairs is connected to a valid powered device when the first impedance falls within a preset range, and determines that the second group of cable pairs is connected to a valid PD when the second impedance falls within the preset range; when the channel controller 11 sends, by using the first group of cable pairs, the first detection voltage to the peer end, the first channel detector D1 detects the current in the first group of cable pairs; and when the channel controller 11 sends, by using the second group of cable pairs, the second detection voltage to the peer end, the second channel detector D2 detects the current in the second group of cable pairs.

The channel controller 11 may first send the first detection voltage, and then send the second detection voltage; or may first send the second detection voltage, and then send the first detection voltage; or may simultaneously send the first detection voltage and the second detection voltage. The first detection voltage may be the same as or different from the second detection voltage.

If a status that a peer end is connected to a PD needs to be determined according to a resistance value of the first impedance, a capacitance value of the first impedance, a resistance value of the second impedance, and a capacitance value of the second impedance, the preset range includes a resistance value range and a capacitance value range.

The channel controller 11 determines that the peer end is connected to a valid PD and that the valid PD is connected to the first group of cable pairs when the resistance value of the first impedance falls within the resistance value range, the capacitance value of the first impedance falls within the capacitance value range, the resistance value of the second impedance is less than a minimum value in the resistance value range or greater than a maximum value in the resistance value range, and the capacitance value of the second impedance is less than a minimum value in the capacitance value range or greater than a maximum value in the capacitance value range.

The channel controller 11 determines that the peer end is connected to a valid PD and that the valid PD is connected to the second group of cable pairs when the resistance value of the second impedance falls within the resistance value range, the capacitance value of the second impedance falls within the capacitance value range, the resistance value of the first impedance is less than a minimum value in the resistance value range or greater than a maximum value in the resistance value range, and the capacitance value of the first impedance is less than a minimum value in the capacitance value range or greater than a maximum value in the capacitance value range.

The channel controller 11 determines that the peer end is not connected to a valid PD when the resistance value of the first impedance is less than a minimum value in the resistance value range or greater than a maximum value in the resistance value range, the capacitance value of the first impedance is less than a minimum value in the capacitance value range or greater than a maximum value in the capacitance value range, the resistance value of the second impedance is less than the minimum value in the resistance value range or greater than the maximum value in the resistance value range, and the capacitance value of the second impedance is less than the minimum value in the capacitance value range or greater than the maximum value in the capacitance value range.

Alternatively, a status that a peer end is connected to a PD may be further determined according to only a resistance value of the first impedance and a resistance value of the second impedance. In this case, the preset range includes only a resistance value range.

The channel controller 11 determines that the peer end is connected to a valid PD and that the valid PD is connected to the first group of cable pairs when the resistance value of the first impedance falls within the resistance value range, and the resistance value of the second impedance is less than a minimum value in the resistance value range or greater than a maximum value in the resistance value range.

The channel controller 11 determines that the peer end is connected to a valid PD and that the valid PD is connected to the second group of cable pairs when the resistance value of the second impedance falls within the resistance value range, and the resistance value of the first impedance is less than a minimum value in the resistance value range or greater than a maximum value in the resistance value range.

The channel controller 11 determines that the peer end is not connected to a valid PD when the resistance value of the first impedance is less than a minimum value in the resistance value range or greater than a maximum value in the resistance value range, and the resistance value of the second impedance is less than the minimum value in the resistance value range or greater than the maximum value in the resistance value range.

Optionally, as shown in FIG. 1 or FIG. 2, the power sourcing equipment chip provided in this embodiment of the present invention further includes a third channel detector D3, where when both the first impedance and the second impedance fall within the preset range, the channel controller 11 sends, along the first group of cable pairs and the second group of cable pairs, a third detection voltage to the peer end by using the third channel detector D3; determines a total resistance according to the third detection voltage and the sum of the currents that is detected by the third channel detector D3; and when the total resistance falls within the resistance value range, determines that both the first group of cable pairs and the second group of cable pairs are connected to a valid powered device and the valid powered device connected to the first group of cable pairs and the valid powered device connected to the second group of cable pairs are a same valid powered device, that is, the peer end is connected to a single valid PD, and a same PD chip in the valid PD is connected to both the first group of cable pairs and the second group of cable pairs; and when the channel controller 11 sends, along the first group of cable pairs and the second group of cable pairs, the third detection voltage to the peer end by using the third channel detector D3, the third channel detector D3 detects the sum of the current in the first group of cable pairs and the current in the second group of cable pairs.

As shown in FIG. 1 or FIG. 2, a probing point of the third detection voltage is located at a joint part between a center tap of a transformer connected to a cable pair 2 and a center tap of a transformer connected to a cable pair 1. That is, if the center tap of the transformer connected to the cable pair 2 is used as a first branch and the center tap of the transformer connected to the cable pair 1 is used as a second branch, the joint part between the center tap of the transformer connected to the cable pair 2 and the center tap of the transformer connected to the cable pair 1 is a trunk obtained after the first branch and the second branch are connected in parallel. Therefore, when the channel controller 11 sends the third detection voltage to the peer end by using the third channel detector D3, a current may be generated in both the first group of cable pairs and the second group of cable pairs.

If the peer end is connected to the single valid PD and the same PD chip in the valid PD is connected to both the first group of cable pairs and the second group of cable pairs, the PSE may supply power to the valid PD by using four cable pairs.

Optionally, when the total resistance falls beyond the resistance value range, for example, less than a minimum value in the resistance value range, the channel controller 11 determines that both the first group of cable pairs and the second group of cable pairs are connected to a valid PD.

In this case, the valid PD connected to the first group of cable pairs and the valid PD connected to the second group of cable pairs may be a same valid PD, where the valid PD includes two PD chips, the first group of cable pairs is connected to one PD chip in the valid PD, and the second group of cable pairs is connected to the other PD chip in the valid PD; or the valid PD connected to the first group of cable pairs and the valid PD connected to the second group of cable pairs are not a same valid PD.

When the channel controller 11 sends the third detection voltage to the peer end by using the third channel detector D3, a current may be generated in both the first group of cable pairs and the second group of cable pairs. Therefore, when the peer end is connected to two valid PDs, a current detected by the third detector is a current in the trunk, that is, the sum of the current in the first group of cable pairs and the current in the second group of cable pairs. In this case, the PSE supplies power to one valid PD by using the first group of cable pairs, and supplies power to the other valid PD by using the second group of cable pairs. Likewise, when the peer end is connected to one valid PD, and the first group of cable pairs and the second group of cable pairs are separately connected to different PD chips in the valid PD, a current detected by the third detector is still a current in the trunk, that is, the sum of the current in the first group of cable pairs and the current in the second group of cable pairs. In this case, the PSE supplies power to the same valid PD by using the first group of cable pairs and the second group of cable pairs.

In addition, to avoid generation of a current in the second group of cable pairs when the channel controller 11 sends the first detection voltage to the peer end by using the first channel detector D1, a diode may be disposed between a trunk and a probing point of the second detection voltage in the second branch. Therefore, a current is generated in only the first group of cable pairs when the channel controller 11 sends the first detection voltage to the peer end by using the first channel detector D1. In addition, to avoid generation of a current in the first group of cable pairs when the channel controller 11 sends the second detection voltage to the peer end by using the second channel detector D2, a diode may be disposed between the trunk and a probing point of the first detection voltage in the first branch. Therefore, a current is generated in only the second group of cable pairs when the channel controller 11 sends the second detection voltage to the peer end by using the second channel detector D2.

Optionally, after determining that the peer end is connected to a valid PD, and that the valid PD is connected to both the first group of cable pairs and the second group of cable pairs, the channel controller 11 controls a first switch circuit 12 to be closed, so that the PSE supplies, along the first group of cable pairs and the second group of cable pairs, power to the valid PD by using the first switch circuit 12. One end of the first switch circuit 12 is connected to the PSE, and the other end of the first switch circuit 12 is connected to a cable, connected to the valid PD, in the Ethernet twisted pair.

Optionally, after determining that both the first group of cable pairs and the second group of cable pairs are connected to a valid PD (may be connected to different PD chips in a same valid PD or may be connected to different valid PDs), the channel controller 11 controls a second switch circuit 13 to be closed, so that the PSE supplies, by using the second switch circuit 13, power to the valid PD connected to the first group of cable pairs. One end of the second switch circuit 13 is connected to the PSE, and the other end of the second switch circuit 13 is connected to a cable in the first group of cable pairs. In addition, the channel controller 11 controls a third switch circuit 14 to be closed, so that the PSE supplies, by using the third switch circuit 14, power to the valid PD connected to the second group of cable pairs. One end of the third switch circuit is connected to the PSE, and the other end of the third switch circuit is connected to a cable in the second group of cable pairs.

If the channel controller 11 determines that the peer end is connected to a single valid PD, and that the valid PD is connected to only the first group of cable pairs, the channel controller 11 controls the second switch circuit 13 to be closed, so that the PSE supplies power to the valid PD by using the second switch circuit 13.

If the channel controller 11 determines that the peer end is connected to a single valid PD, and that the valid PD is connected to only the second group of cable pairs, the channel controller 11 controls the third switch circuit 14 to be closed, so that the PSE supplies power to the valid PD by using the third switch circuit 14.

In FIG. 1, the first switch circuit 12, the second switch circuit 13, and the third switch circuit 14 are located inside the PSE chip provided in this embodiment of the present invention. In FIG. 2, the first switch circuit 12, the second switch circuit 13, and the third switch circuit 14 are located outside the PSE chip provided in this embodiment of the present invention.

As shown in FIG. 1 or FIG. 2, two ends of an inductor in each transformer are connected to two contacts in an 8P8C modular connector of the Ethernet twisted pair, and two ends of the other inductor in the transformer are connected to a data processing chip for receiving a data signal, or the two ends of the other inductor are unconnected.

Optionally, the PSE chip provided in this embodiment of the present invention further includes a channel monitor S. When the PSE supplies power to each PD by using the Ethernet twisted pair, the channel monitor S monitors a current output by the PSE to each PD.

The channel controller 11 acquires a current that is output by the PSE to each valid PD and monitored by the channel monitor S, and opens a switch circuit that is connected to a cable, connected to the valid PD, in the Ethernet twisted pair when a current output by the PSE to the valid PD is less than a minimum current, or when power that is output by the PSE to the valid PD and determined according to a current output by the PSE to the valid PD is greater than power corresponding to the valid PD after classification, so that the PSE stops supplying power to the valid PD. If the valid PD is connected to the first group of cable pairs, the channel controller 11 opens the second switch circuit 13; if the valid PD is connected to the second group of cable pairs, the channel controller 11 opens the third switch circuit 14; or if the valid PD is connected to both the first group of cable pairs and the second group of cable pairs, the channel controller 11 opens the first switch circuit 12. The minimum current may be any value in a range from 5 mA to 10 mA.

The foregoing switch circuit may be a metal-oxide semiconductor field-effect transistor (MOSFET), or may be another component with a switch function, for example, a junction field effect transistor (JFET) or a bipolar junction transistor (BJT). That the switch circuit is a MOSFET is used as an example. The channel controller in the PSE chip provided in this embodiment of the present invention changes a voltage at a gate of the MOSFET, to enable the MOSFET to switch between a active state and an cutoff state.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power sourcing equipment (PSE) chip, comprising:
a channel controller;
a first channel detector, configured to connect to a first group of cable pairs in an Ethernet twisted pair, and not to connect electrically to a second group of cable pairs in the Ethernet twisted pair;
a second channel detector, configured to connect to the second group of cable pairs, and not to connect electrically to the first group of cable pairs; and
a third channel detector, configured to connect to both the first group of cable pairs and the second group of cable pairs;
wherein the channel controller is configured to:
send, along the first group of cable pairs, a first detection voltage using the first channel detector, and send, along the second group of cable pairs, a second detection voltage using the second channel detector, wherein the first detection voltage and the second detection voltage are sent simultaneously;
determine a first impedance according to the first detection voltage and a current that is detected by the first channel detector, and determine a second impedance according to the second detection voltage and a current that is detected by the second channel detector;
supply power along only the first group of cable pairs when the first impedance falls within a preset range and the second impedance falls beyond the preset range; and
supply power along only the second group of cable pairs when the second impedance falls within the preset range and the first impedance falls beyond the preset range;
wherein the first channel detector is configured to: detect the current in the first group of cable pairs when the channel controller sends, along the first group of cable pairs, the first detection voltage using the first channel detector;
wherein the second channel detector is configured to: detect the current in the second group of cable pairs when the channel controller sends, along the second group of cable pairs, the second detection voltage using the second channel detector;
wherein the channel controller is further configured to:
when both the first impedance and the second impedance fall within the preset range: send, along the first group of cable pairs and the second group of cable pairs, a third detection voltage using the third channel detector, and determine a total resistance according to the third detection voltage and a sum of currents that is detected by the third channel detector; and
supply power using a trunk when both the first impedance and the second impedance fall within the preset range and the total resistance falls within a resistance value range, and supply power along the first group of cable pairs and the second group of cable pairs when the channel controller supplies power using the trunk; and
wherein the third channel detector is further configured to: detect the sum of the current in the first group of cable pairs and the current in the second group of cable pairs when the channel controller sends, along the first group of cable pairs and the second group of cable pairs, the third detection voltage using the third channel detector.

2. The PSE chip according to claim 1, wherein the channel controller is further configured to:
supply power using a first branch and supply power using a second branch when both the first impedance and the second impedance fall within the preset range and the total resistance falls beyond the resistance value range, wherein power supply performed using the first branch is independent of power supply performed by using the second branch; and
supply power along only the first group of cable pairs when power is supplied using the first branch, and supply power along only the second group of cable pairs when power is supplied using the second branch.

3. A method, comprising:
sending, by a power sourcing equipment (PSE) chip, a first detection voltage through an Ethernet interface along a first group of cable pairs in an Ethernet twisted pair;
detecting, by the PSE chip, a current in the first group of cable pairs when the first detection voltage is sent along the first group of cable pairs;
determining, by the PSE chip, a first impedance according to the first detection voltage and the current in the first group of cable pairs that is detected when the first detection voltage is sent;
sending, by the PSE chip, a second detection voltage through the Ethernet interface along a second group of cable pairs in the Ethernet twisted pair, wherein the first detection voltage and the second detection voltage are sent simultaneously;
detecting, by the PSE chip, a current in the second group of cable pairs when the second detection voltage is sent along the second group of cable pairs;
determining, by the PSE chip, a second impedance according to the second detection voltage and the current in the second group of cable pairs that is detected when the second detection voltage is sent;
supplying, by the PSE chip, power along only the first group of cable pairs when the first impedance falls within a preset range and the second impedance falls beyond the preset range; or supplying power along only the second group of cable pairs when the second impedance falls within the preset range and the first impedance falls beyond the preset range; and
when both the first impedance and the second impedance fall within the preset range, Performing the following:
sending, by the PSE chip, a third detection voltage through the Ethernet interface along the first group of cable pairs and the second group of cable pairs;
detecting, by the PSE chip, a sum of the current in the first group of cable pairs and the current in the second group of cable pairs when the third detection voltage is sent along the first group of cable pairs and the second group of cable pairs;
determining, by the PSE chip, a total resistance according to the third detection voltage and the detected sum of the currents;
supplying power, by the PSE chip, using a trunk when the total resistance falls within a resistance value range; and
supplying power along the first group of cable pairs and the second group of cable pairs when the PSE chip supplies power using the trunk.

4. The method according to claim 3, further comprising:
supplying, by the PSE chip, power using a first branch and supplying power using a second branch when both the first impedance and the second impedance fall within the preset range and the total resistance is not within the resistance value range, wherein power supply performed using the first branch is independent of power supply performed using the second branch; and
supplying power along only the first group of cable pairs when the PSE chip supplies power by using the first branch, and supplying power along only the second group of cable pairs when the PSE chip supplies power by using the second branch.

5. A power sourcing equipment (PSE) device, comprising:
a PSE chip; and
an Ethernet port;

wherein:
the Ethernet port is configured to connect to an Ethernet twisted pair;
the PSE chip comprises a channel controller, a first channel detector, a second channel detector and a third channel detector;
the first channel detector is configured to connect to a first group of cable pairs comprised in the Ethernet twisted pair via the Ethernet port, and not to connect electrically to a second group of cable pairs comprised in the Ethernet twisted pair;
the second channel detector is configured to connect to the second group of cable pairs via the Ethernet port, and not to connect electrically to the first group of cable pairs; and
the third channel detector is configured to connect to both the first group of cable pairs and the second group of cable pairs via the Ethernet port;
the channel controller is configured to:
send, along the first group of cable pairs, a first detection voltage using the first channel detector, and send, along the second group of cable pairs, a second detection voltage using the second channel detector, wherein the first detection voltage and the second detection voltage are sent simultaneously;
determine a first impedance according to the first detection voltage and a current that is detected by the first channel detector, and determine a second impedance according to the second detection voltage and a current that is detected by the second channel detector;
supply power along only the first group of cable pairs when the first impedance falls within a preset range and the second impedance falls beyond the preset range;
supply power along only the second group of cable pairs when the second impedance falls within the preset range and the first impedance falls beyond the preset range;
the first channel detector is configured to: detect the current in the first group of cable pairs when the channel controller sends, along the first group of cable pairs, the first detection voltage using the first channel detector; and
the second channel detector is configured to: detect the current in the second group of cable pairs when the channel controller sends, along the second group of cable pairs, the second detection voltage using the second channel detector;
the channel controller is further configured to:
send, along the first group of cable pairs and the second group of cable pairs, a third detection voltage using the third channel detector when both the first impedance and the second impedance fall within the preset range, and determine a total resistance according to the third detection voltage and the sum of currents that is detected by the third channel detector; and
supply power using a trunk when both the first impedance and the second impedance fall within the preset range and the total resistance falls within a resistance value range, and supply power along the first group of cable pairs and the second group of cable pairs when the channel controller supplies power using the trunk; and
the third channel detector is further configured to: detect a sum of the current in the first group of cable pairs and the current in the second group of cable pairs when the channel controller sends, along the first group of cable pairs and the second group of cable pairs, the third detection voltage by using the third channel detector.

6. The PSE device according to claim 5, wherein the channel controller is further configured to:

supply power using a first branch and supply power using a second branch when both the first impedance and the second impedance fall within the preset range and the total resistance falls beyond the resistance value range, wherein power supply performed using the first branch is independent of power supply performed using the second branch; and supply power along only the first group of cable pairs when power is supplied using the first branch, and supply power along only the second group of cable pairs when power is supplied using the second branch.

* * * * *